(12) United States Patent
De Rango et al.

(10) Patent No.: US 8,940,083 B2
(45) Date of Patent: Jan. 27, 2015

(54) HYDROGEN STORAGE TANK

(75) Inventors: Patricia De Rango, Gieres (FR); Albin Chaise, Fontaine (FR); Daniel Fruchart, Echirolles (FR); Philippe Marty, Saint Martin d'Uriage (FR); Salvatore Miraglia, Grenoble (FR)

(73) Assignees: Centre National de la Recherche Scientifique (C.N.R.S.), Paris (FR); Universite Joseph Fourier, Grenoble Cedex (FR)

( * ) Notice: Subject to any disclaimer, the term of this patent is extended or adjusted under 35 U.S.C. 154(b) by 1173 days.

(21) Appl. No.: 12/747,261

(22) PCT Filed: Dec. 9, 2008

(86) PCT No.: PCT/FR2008/052252
§ 371 (c)(1),
(2), (4) Date: Sep. 13, 2010

(87) PCT Pub. No.: WO2009/080975
PCT Pub. Date: Jul. 2, 2009

(65) Prior Publication Data
US 2010/0326992 A1 Dec. 30, 2010

(30) Foreign Application Priority Data

Dec. 10, 2007 (FR) .................... 07 59690

(51) Int. Cl.
*B01D 53/04* (2006.01)
*F17C 11/00* (2006.01)
(Continued)

(52) U.S. Cl.
CPC ................ *F17C 1/00* (2013.01); *C01B 3/0005* (2013.01); *F17C 11/005* (2013.01); *F17C 2221/00* (2013.01); *F17C 2227/0309* (2013.01);
(Continued)

(58) Field of Classification Search
USPC .................... 96/108, 146, 153, 154; 502/526; 206/0.7; 423/658.2
See application file for complete search history.

(56) References Cited

U.S. PATENT DOCUMENTS

| 4,583,638 A | * | 4/1986 | Bernauer et al. ................ 206/0.7 |
| 4,609,038 A | * | 9/1986 | Ishikawa et al. ......... 165/104.12 |
| 5,443,616 A | * | 8/1995 | Congdon ........................ 75/240 |

(Continued)

FOREIGN PATENT DOCUMENTS

| DE | 35 42 185 | 6/1986 |
| DE | 10 2004 003 319 | 8/2004 |

(Continued)

OTHER PUBLICATIONS

Lai Shenggang et al., "Expanded graphite sealing material and product of same", China Petrochemical Press—1st version May 1994, cited in the Chinese Office Action.

(Continued)

*Primary Examiner* — Frank Lawrence
(74) *Attorney, Agent, or Firm* — Young & Thompson

(57) ABSTRACT

The tank is of the type including a container (4) for housing hydrogen, and metallic hydride placed inside the container. According to one aspect of the invention, it includes at least one solid body (6) formed of a compacted material including metallic hydride and a matrix. Application in particular for tanks for internal combustion engines or for fuel cells, in particular for motor vehicles, as well as for any stationary or mobile application using hydrogen.

20 Claims, 7 Drawing Sheets

(51) Int. Cl.
*F17C 1/00* (2006.01)
*C01B 3/00* (2006.01)

(52) U.S. Cl.
CPC ....... *F17C2227/0369* (2013.01); *Y02E 60/321* (2013.01); *Y02E 60/325* (2013.01); *Y02E 60/327* (2013.01)
USPC ............................................ 96/146; 206/0.7

(56) References Cited

U.S. PATENT DOCUMENTS

| | | | |
|---|---|---|---|
| 6,432,176 B1 * | 8/2002 | Klos et al. ..................... | 96/117.5 |
| 6,432,379 B1 * | 8/2002 | Heung ........................ | 423/648.1 |
| 6,596,055 B2 * | 7/2003 | Cooper et al. .................. | 95/116 |
| 6,991,770 B2 * | 1/2006 | Suzuki et al. ................. | 422/198 |
| 7,169,214 B2 | 1/2007 | Kubo et al. | |
| 7,947,119 B2 * | 5/2011 | Golz et al. ...................... | 95/116 |
| 8,012,452 B2 * | 9/2011 | Fruchart et al. ............... | 423/644 |
| 8,636,834 B2 * | 1/2014 | Fruchart et al. ................ | 96/126 |
| 2004/0129048 A1 | 7/2004 | Myasnikov et al. | |
| 2006/0178266 A1 * | 8/2006 | Yen et al. ....................... | 502/526 |
| 2006/0237688 A1 * | 10/2006 | Zimmermann ............... | 252/184 |
| 2007/0031325 A1 | 2/2007 | Carruthers et al. | |
| 2009/0278086 A1 | 11/2009 | Fruchart et al. | |

FOREIGN PATENT DOCUMENTS

| | | |
|---|---|---|
| FR | 06 51478 | 2/1929 |
| FR | 2 900 401 | 11/2007 |
| JP | 62171600 A | 7/1987 |
| JP | 2001214206 A | 8/2001 |
| JP | 2001263594 A | 9/2001 |
| JP | 2005343771 A | 12/2005 |
| WO | 97/21370 | 6/1997 |
| WO | 97/36818 | 10/1997 |
| WO | 2006111005 A1 | 10/2006 |
| WO | WO 2006/119428 A2 * | 11/2006 |
| WO | 2007/011476 | 1/2007 |
| WO | 2007/125253 | 11/2007 |

OTHER PUBLICATIONS

English translation of Chinese Office Action, dated Feb. 19, 2013, from corresponding CN application.
International Search Report dated Jul. 8, 2009, from corresponding PCT application.

* cited by examiner

HYDROGEN STORAGE TANK

BACKGROUND OF THE INVENTION

1. Field of the Invention

The present invention relates to a storage tank for hydrogen in the form of a metallic hydride, of the type comprising a container for housing hydrogen, and metallic hydride placed inside the container.

A tank of the aforesaid type may be used for supplying hydrogen to a fuel cell or a heat engine.

2. Description of the Related Art

WO 2007/011476A2 describes a hydrogen storage tank comprising a tubular container inside which cells are arranged, each cell being composed of a plurality of small, sector-shaped receptacles, each receptacle containing metallic hydride powder.

SUMMARY OF THE INVENTION

It is an aim of the invention to provide a storage tank for hydrogen in the form of metallic hydride which permits the storage of a large volume of hydrogen, with satisfactory charging and discharging speeds.

To this end, the invention proposes a hydrogen storage tank of the aforesaid type, characterized in that it comprises at least one solid body formed of a compacted material comprising metallic hydride and a matrix.

According to other embodiments, the tank comprises one or more of the following features, taken singly or in all the technically possible combinations:

- the matrix is formed of expanded graphite, preferably of expanded natural graphite;
- the metallic hydride is a hydride of magnesium or of magnesium alloy;
- the tank comprises a plurality of solid bodies stacked inside the container in a stacking direction;
- the or each solid body is in the shape of a pellet and is held inside the container in such a way as to create an annular space between the lateral inner surface of the container and the or each solid body;
- the tank comprises a heat exchanger having at least one duct for a heat exchange fluid, extending inside the container;
- the duct extends through solid bodies;
- the tank comprises metal plates threaded onto the duct alternately with the solid bodies;
- the tank comprises annular spacers threaded onto the duct alternately with the metal plates, the or each solid body being threaded onto a spacer;
- the duct comprises a feed pipe and a discharge pipe for a heat exchange fluid which are substantially coaxial;
- the duct comprises an outer tube and an inner tube extending inside the outer tube, the inner tube defining one of the feed pipe and the discharge pipe for the heat exchange fluid, and the outer tube defining with the inner tube the other of the feed pipe and the discharge pipe;
- the feed pipe communicates with the discharge pipe via openings distributed along the inner tube;
- the discharge pipe is annular and surrounds the feed pipe;
- the tank comprises heating elements for the solid bodies;
- each heating element extends through several solid bodies; and
- the heating elements are electrical resistances;
- the solid bodies are held spaced apart from one another along the stacking axis, with a gas circulation space between them;
- the or each solid body comprises between 15% and 25% by mass of expanded graphite, in particular around 20% by mass of expanded graphite; and
- the or each solid body comprises between 1 and 10% by mass of expanded graphite, in particular between 5% and 10% by mass of expanded graphite.

BRIEF DESCRIPTION OF THE DRAWING FIGURES

The invention and its advantages will become clearer from the following description, provided solely by way of example and with reference to the appended drawings, in which.

DETAILED DESCRIPTION OF THE INVENTION

Figure 1:
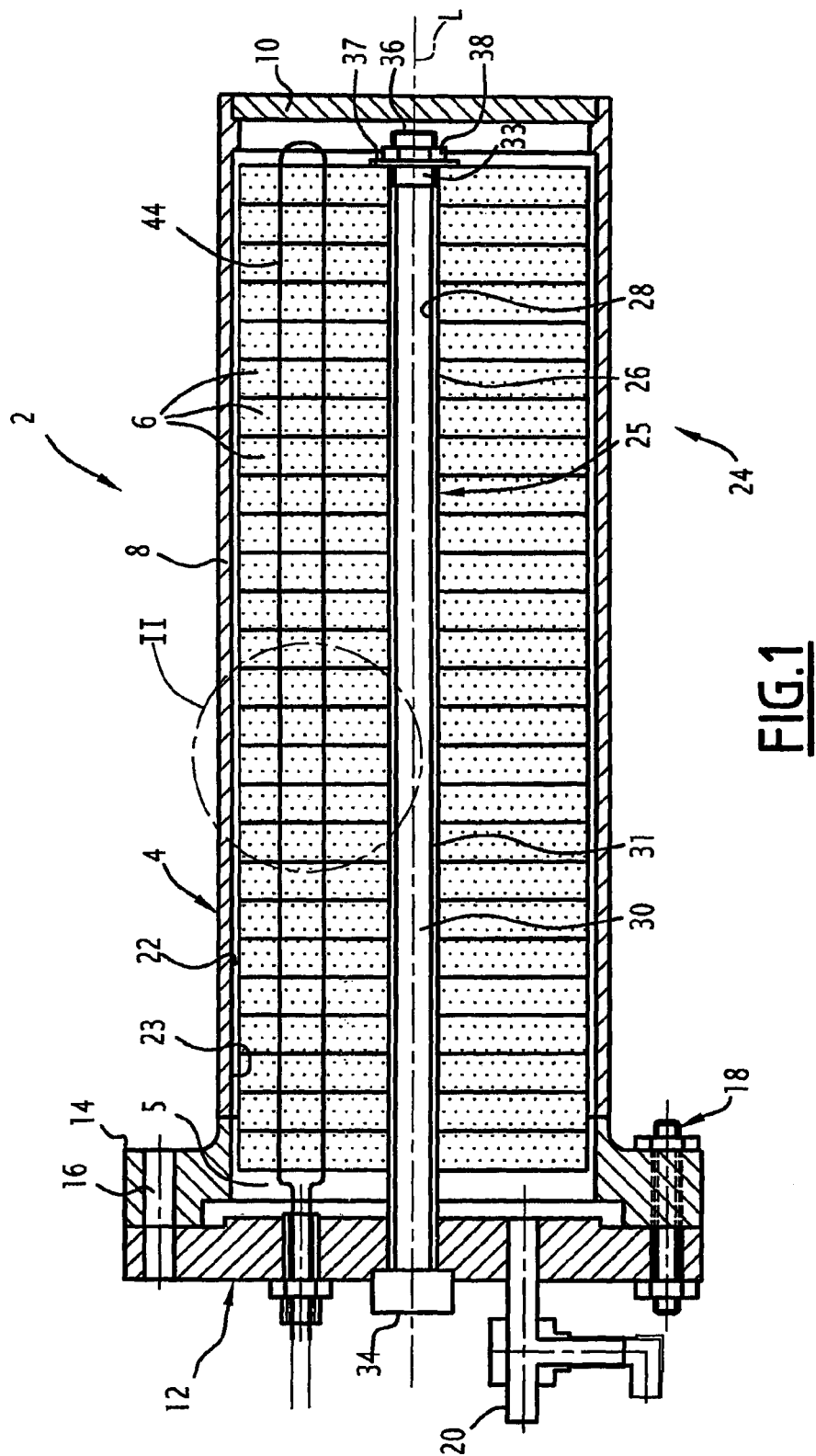
FIG. 1 is a schematic view in longitudinal section of a hydrogen tank comprising pellets of compacted composite material.

FIG. 1 illustrates a tank 2 according to the invention for hydrogen storage in the form of metallic hydride.

The tank 2 comprises a container 4 for hydrogen, defining an internal volume 5, and a plurality of pellets 6 for hydrogen storage in the form of metallic hydride, which are arranged inside the container 4.

The container 4 is tubular. It comprises a tube 8 with longitudinal axis L, closed at one longitudinal end by a fixed cap 10, welded onto the tube 8, and at the opposite longitudinal end by a removable cap 12. The tube 8 has a circular transverse section.

The removable cap 12 is for example screwed onto a fixing ring 14 welded to the end of the tube 8 and extending the tube 8 radially towards the outside. The ring 14 is equipped with openings 16 for the passage of fixing members, such as bolts 18. The container 4 comprises a plurality of bolts 18 distributed about the axis L.

The tank 2 comprises a hydrogen circulation pipe 20 passing through the removable cap 12 in a leaktight manner. It enables the volume 5 to be connected to a hydrogen supply source, or to a hydrogen consumption unit, such as a fuel cell or a heat engine.

Each pellet 6 is in the form of a solid body made of a compacted composite material comprising magnesium hydride and a matrix formed of expanded graphite, preferably of expanded natural graphite (ENG). The composite material and its method of preparation will be described in more detail hereinafter.

Each pellet 6 has a peripheral contour corresponding substantially to the cross-section of the tube 8, circular in this case. The pellets 6 are aligned and stacked along the axis L within the tank 4.

Each pellet 6 has an outside diameter substantially smaller than the inside diameter of the tube 8. The result is that the tank 2 has an annular space 22 created between the pellets 6 and the lateral inner surface 23 of the tube 8, and extending along the axis L over the length of the stack of pellets 6.

The tank 2 comprises a heat exchanger 24 extending inside the container 4, for heating and/or cooling the pellets 6 by heat exchange with a heat exchange fluid circulating within the heat exchanger 24.

The heat exchanger 24 comprises a duct 25 for heat exchange fluid extending axially in the centre of the container 4, along the axis L.

The duct 25 comprises an outer tube 26 and an inner tube 28 which are coaxial. The inner tube 28 defines a central pipe 30 for channelling the heat exchange fluid. The outer tube 26 surrounds the inner tube 28 and with the latter defines an annular pipe 31 for channelling the heat exchange fluid surrounding the central pipe 30.

The wall of the inner tube 28 comprises openings 32 (FIG. 2) distributed along the inner tube 28 for the circulation of the heat exchange fluid between the annular pipe 31 and the central pipe 30.

The duct 25 comprises at one end a plug 33 (FIG. 1) for closing the outer tube 26 and the inner tube 28.

The opposite end of the duct 25 passes through the removable cap 12 in a sealed manner, and is equipped with an end-piece 34 for connecting the central pipe 30 and the annular pipe 31 to a circuit (not shown) for heat exchange fluid.

The central pipe 30 and the annular pipe 31 are connected to the circuit in such a way that the central pipe 30 is a feed pipe and the annular pipe 31 is a discharge pipe. As a variant, the direction of circulation of the heat exchange fluid is reversed.

The pellets 6 are pierced at their centre. They are threaded onto the outer tube 26, being stacked along the axis L. Thus, the duct 25 holds the pellets 6 inside the container 4.

The plug 33 comprises a threaded pin 36. The tank 2 comprises a support washer 37 and a clamping screw 38 screwed onto the pin 36 to hold the pellets 6 along the axis L on the duct 25.

Figure 2:
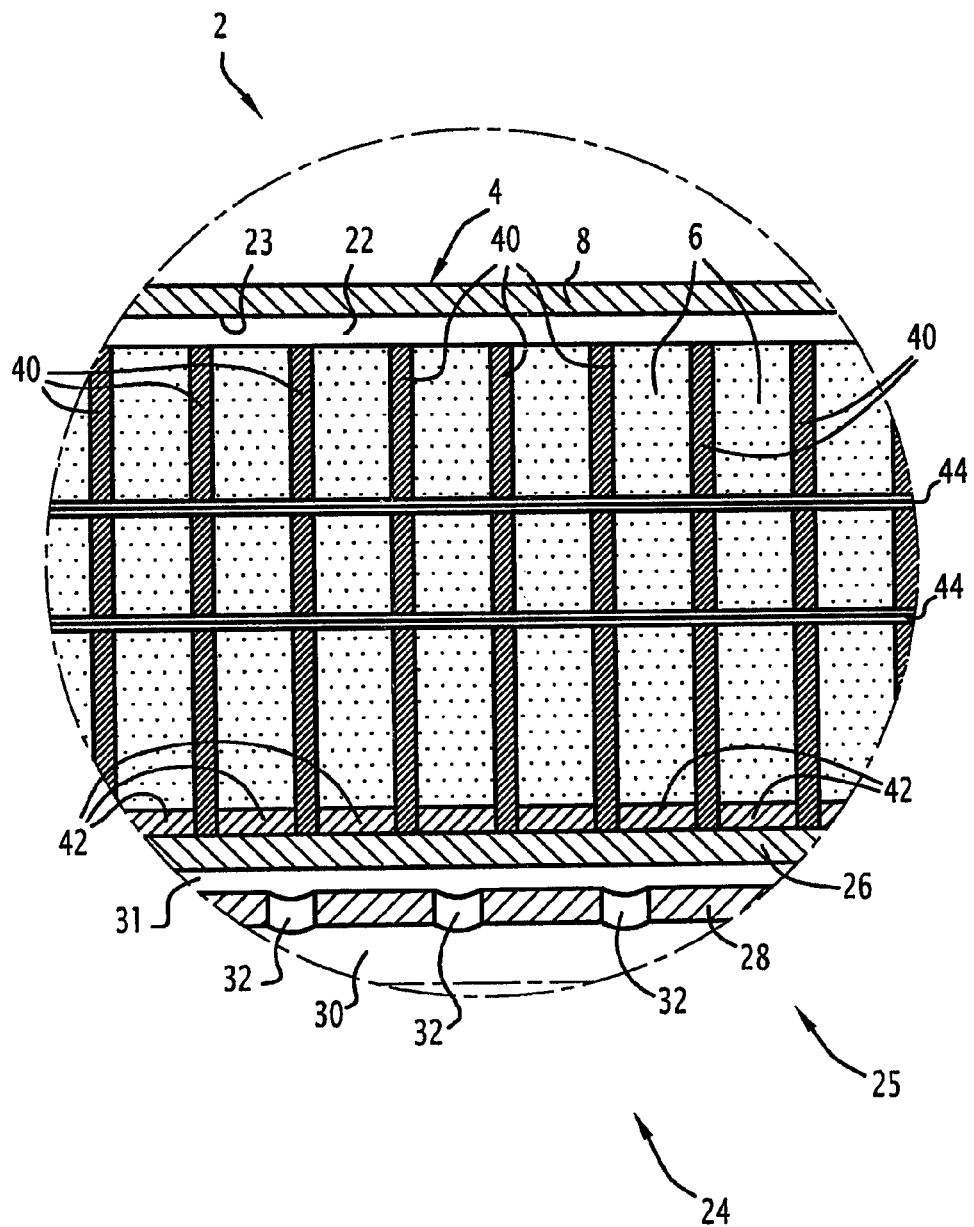
FIG. 2 is an enlarged view of the area II of FIG. 1.

As shown in FIG. 2, the heat exchanger 24 comprises plates 40 inserted alternately between the pellets 6.

Each plate 40 is in the shape of a disc having an outer contour substantially identical to that of the pellets 6, and pierced at its centre. Each plate 40 is threaded onto the outer tube 26.

Each plate 40 is in contact by its inner edge with the outer tube 26, and in contact by its opposite surfaces with the pellets 6.

The heat exchanger 24 comprises annular spacers 42 inserted between the plates 40 to maintain their spacing. Each pellet 6 is threaded onto a spacer 42 which is itself threaded onto the outer tube 26.

The plates 40 are intended to improve the heat exchanges between the outer tube 26 and the pellets 6 by conducting the heat between the outer tube 26 and the periphery of the pellets 6. They are for example metallic, preferably made of copper.

The plates 40 and the duct 25 form a supporting framework for the pellets 6. The framework comprises a plurality of annular gaps, each gap being defined between two plates 40, and opening out radially towards the outside in the space 22.

The tank 2 comprises heating elements 44 extending through the pellets 6.

Each heating element 44 is in the form of a metal rod extending through the pellets 6. Each heating element 44 passes through the removable cap 12 in a sealed manner for its connection to an electrical supply circuit (not shown) for the production of heat inside the container 4 by heat dissipation by the Joule effect.

In a method of manufacture of the tank 2, a plurality of pellets 6 are produced, the duct 25 and the heating elements 44 are fixed onto the removable cap 12, the pellets 6, the spacers 42 and the plates 40 are threaded onto the outer tube 26 of the duct 25, the whole is inserted inside the tube 8, then the removable cap 12 is fixed onto the ring 16.

The tank 2 thus obtained initially contains hydrogen in the form of magnesium hydride.

As indicated previously, each pellet 6 is in the form of a solid body formed of a compacted composite material comprising magnesium hydride and a matrix (or "skeleton") formed of expanded graphite, preferably of expanded natural graphite (ENG).

The material is qualified as "composite" owing to the combined use of a metallic hydride and a matrix, here made of ENG.

The composite material is intended to store hydrogen by absorption in the form of magnesium hydride and to release hydrogen by desorption. The desorption of hydrogen results in the appearance of non-hydrogenated magnesium in the composite material. In the continuation of the description, for reasons of simplicity, "magnesium hydride" designates magnesium hydride and any fraction of non-hydrogenated magnesium of composite material.

Within the framework of the invention, "compacted" designates a material in which the density is significantly higher than that of the respective divided raw materials of which it is composed, in this case magnesium hydride and ENG. The density of the composite material is 100% greater, and may be 400% greater, than that of the divided raw materials.

According to a method for preparing the pellets 6, the composite material is obtained by compaction of a mixture of magnesium hydride powder ($MgH_2$) and of particles of ENG.

The magnesium hydride powder preferably has a grain size of between 1 and 10 μm.

The mixture of powders is produced in a conventional manner, for example in a mixer, at ambient temperature and at atmospheric pressure.

The compaction of the mixture of powders is carried out preferably by uniaxial compression, for example in a pelleting machine.

Preferably, mixing and compaction are carried out under a controlled atmosphere, in particular in order to avoid oxidation of the magnesium hydride powder, which is pyrophoric.

The pressure exerted during compaction is selected in particular according to the porosity desired in the composite material. By way of example, a pressure of the order of 1 $t/cm^2$ ($10^8$ Pa) has proved suitable for obtaining pellets having a porosity of the order of 0.3.

Figure 3:
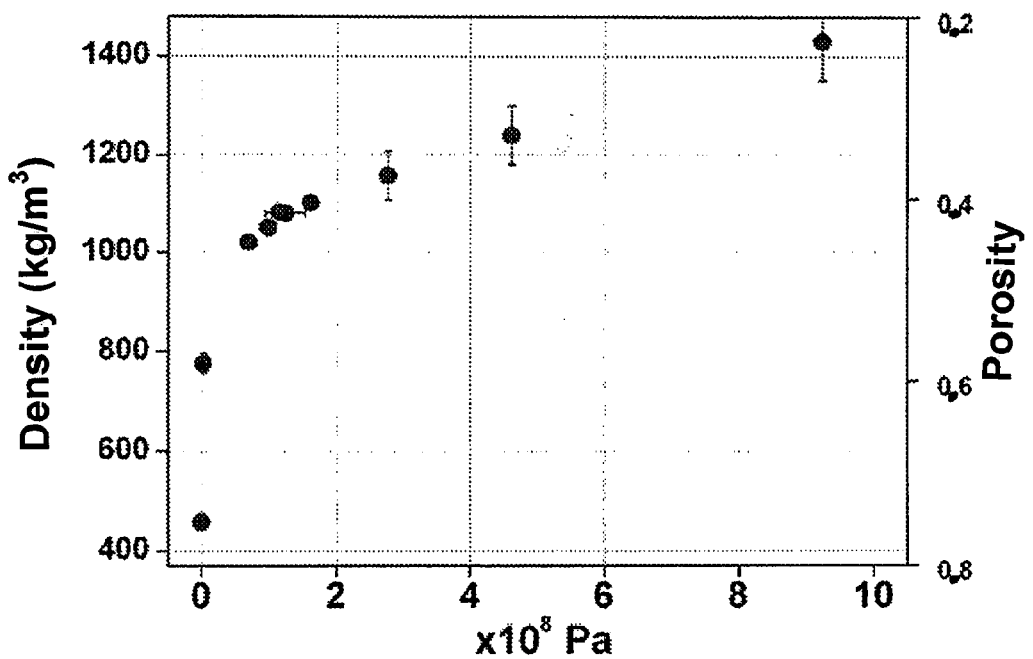
FIG. 3 is a graph illustrating the density and the porosity of pellets of compacted composite material, in dependence on the compaction pressure.

The graph of FIG. 3 illustrates the density and the porosity of pellets of compacted composite material obtained according to the invention, for different compaction pressures.

Compaction increases the volume density of metallic hydride, and therefore the hydrogen storage volume capacity. Compaction also increases the thermal conductivity by reducing the voids within the material.

ENG is a form of graphite modified by chemical and thermal treatments. ENG is a good conductor of heat and consequently improves the thermal conductivity of the composite material. Its presence and its structure facilitate the cohesion of the composite material. The result is that the composite material has a very high mechanical strength, permitting machining of the pellets, and facilitating their handling for loading them into the tank.

In addition, and surprisingly, unlike a metallic hydride powder, the composite material is not pyrophoric, thereby making it safer to handle and facilitating in particular the charging of the tanks.

Advantageously, the magnesium hydride powder used for the mixture includes less than 10% by weight, preferably less than 5% by weight, of non-hydrogenated magnesium. The more perfectly the magnesium hydride is hydrogenated, the more stable the powder will be with respect to air.

Preferably, before the mixing step, the magnesium hydride powder is activated, in order to have more favourable kinetics of absorption and desorption of hydrogen. This activation step is carried out for example by co-grinding of the magnesium hydride with a transition metal or an alloy of transition metals, or a transition metal oxide, introduced in proportions of between 1 and 10% atomic relative to the mixture.

The term "transition metal" as used here relates to chemical elements having in the atomic state a partially filled sub-layer d and which form at least one ion with a sub-layer d and partially filled. Those particularly referred to are the transition metals V, Nb, Ti, Cr and Mn.

In a particularly preferred embodiment, the magnesium hydride powder is activated according to the teaching of the French patent application filed under No. FR 06 51478 and published under No. FR 2 900 401 or that of the corresponding international application published under No. WO 2007/125253A1, by co-grinding with an alloy of centred cubic structure comprising titanium, vanadium and either chromium or manganese, introduced in proportions of between 1 and 10% atomic relative to the mixture.

The particles of ENG are advantageously in the form of elongate vermicules, with a diameter of the order of 500 μm and a length of a few millimetres.

As a result of the effect of uniaxial compaction, the vermicules are oriented substantially perpendicularly to the compression axis. This imparts to the composite material a strongly anisotropic thermal behaviour, and facilitates the conduction of heat perpendicularly to the compression axis.

Advantageously, the pellets 6 are obtained by uniaxial compaction along their axis. The result is that the vermicules are oriented perpendicularly to the axis of each pellet 6, and the radial thermal conductivity of the pellets 6 is improved.

The thermal conductivity of the composite material depends on the proportion of ENG in the composite material.

Figure 4:
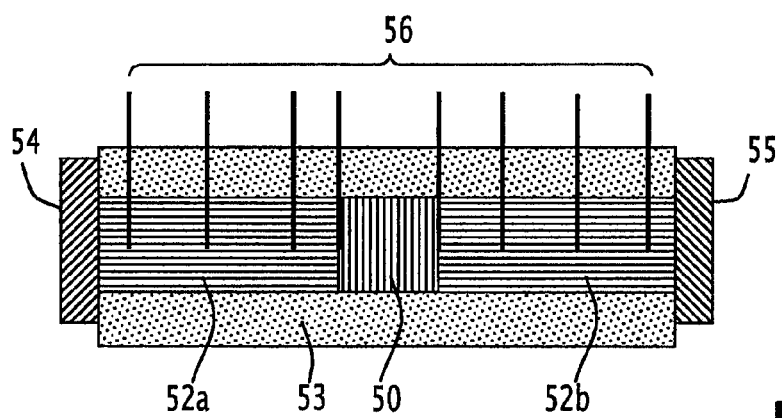
FIG. 4 is a schematic view of a bench for measuring thermal conductivity according to the divided bar principle.
Figure 5:
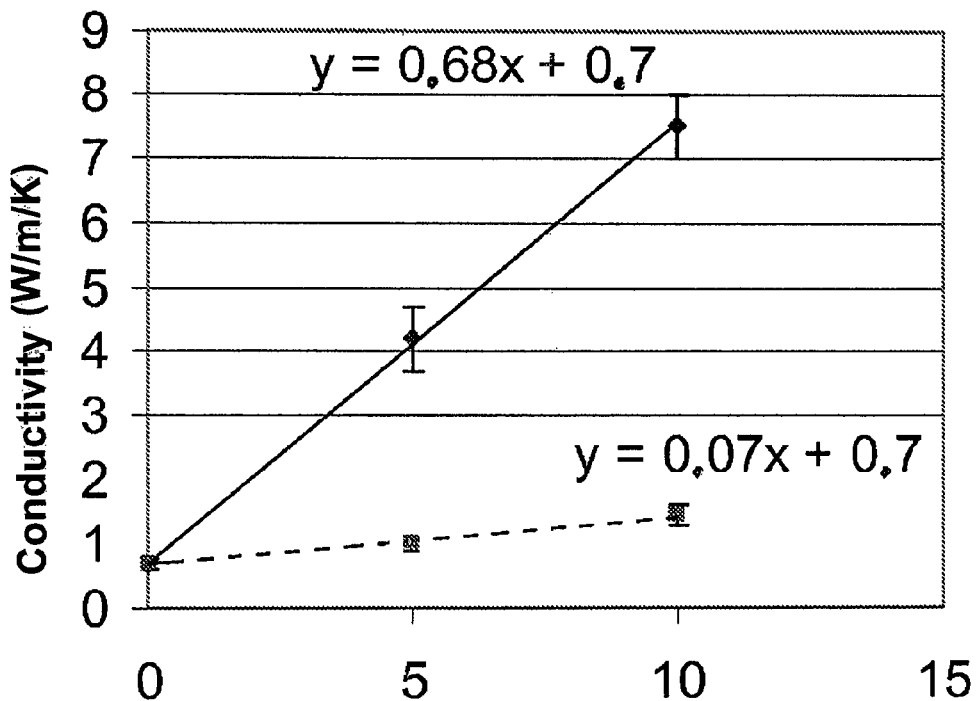
FIG. 5 is a graph illustrating thermal conductivity measurements carried out on pellets of compacted composite material.

Measurements were carried out on pellets prepared with different contents of ENG. The measurements were carried out on a conventional continuous duty measuring bench based on the principle of the divided bar, as illustrated in FIG. 4.

According to this principle, a sample 50 is positioned between two standard parts 52a, 52b and disposed between two layers 53 of thermal insulation, the whole being in contact on either side with a hot plate 54 and a cold plate 55. Thermocouples 56 are inserted into the standards and the sample in order to take the temperature at different places distributed between the plates 54, 55.

Samples were cut out from the pellets, along the axis of the pellet and perpendicularly to the axis, in order to measure the axial and radial thermal conductivity of each pellet.

Three compositions of composite material comprising 0%, 5% and 10% by weight of ENG were tested.

Figure 6:
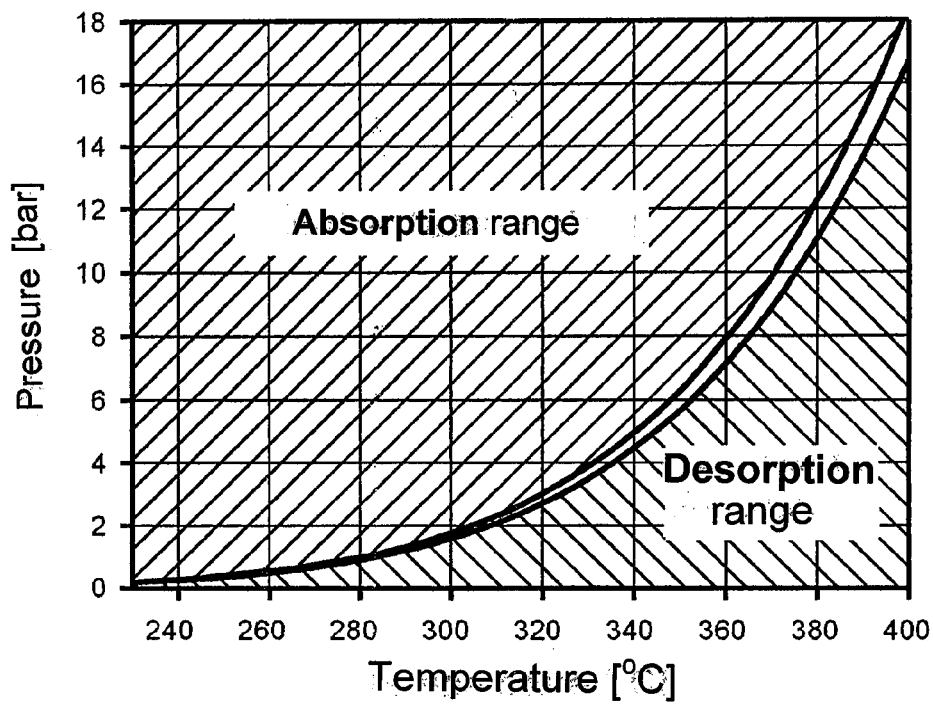
FIG. 6 is a graph illustrating the equilibrium curve between magnesium (Mg) and magnesium hydride ($MgH_2$) in dependence on the temperature and the pressure.

The graph of FIG. 6 illustrates the measurements of axial conductivity (dashed lines) and radial conductivity (solid lines), according to the proportion by weight of ENG. The average temperature of the samples during the measurements was of the order of 30° C.

The thermal conductivity is substantially proportional to the proportion of ENG. The radial thermal conductivity increases more rapidly with the ENG content than the axial thermal conductivity.

The capacity by mass of hydrogen absorption of the composite material depends on the proportion of magnesium in the composite material, ENG absorbing a priori no hydrogen.

The proportion of ENG is not particularly limited. It is selected according to a compromise between the thermal conductivity and the capacity by mass of hydrogen absorption.

A low content of ENG, of the order of from 1 to 10% by weight relative to the final composition, already makes it possible to increase the thermal conductivity significantly. Therefore, the composite material preferably comprises from 5 to 10% by weight of ENG.

The kinetics of absorption and desorption of hydrogen are not significantly affected by the shaping of the material.

It is assumed that the material contains very few or no compounds resulting from a chemical reaction between the activated magnesium hydride and the ENG.

The composite material is easy to manufacture. It uses available raw materials, is inexpensive and does not require sophisticated equipment for its production and its shaping into pellets.

In operation, the hydrogen is discharged from the tank 2 by desorption of the hydrogen from the composite material in suitable pressure and temperature conditions, and the hydrogen is charged into the tank 2 by absorption of hydrogen by the magnesium of the composite material in suitable pressure and temperature conditions.

The desorption of hydrogen from the composite material leads to the formation of metallic magnesium, available for subsequent absorption of hydrogen.

The graph of FIG. 6 illustrates the curve of equilibrium between magnesium (Mg) and magnesium hydride ($MgH_2$) according to the temperature and the pressure.

The desorption of the hydrogen by the magnesium hydride is endothermic, and is interrupted spontaneously in the absence of the application of heat. The absorption of hydrogen by magnesium is exothermic, and it is advisable to evacuate the heat in order to charge the hydrogen in a reasonable period of time, preventing the reaction from being interrupted spontaneously.

In order to charge the tank 2 with hydrogen or to extract hydrogen from it, the hydrogen pressure within the container 4 and the temperature of the pellets 6 are maintained within suitable ranges.

The temperature of the pellets 6 is adjusted by means of the heating elements 44 and the heat exchanger 24. The heating elements 44 are used principally for applying heat to the pellets. The heat exchanger 24 is used principally for evacuating heat, by circulating within the heat exchanger 24 a fluid at a low temperature. The heat exchanger 24 may also be used for applying heat by circulating within the heat exchanger 24 a fluid at a raised temperature.

During charging and discharging, the hydrogen emerges from or penetrates into the pellets 6 through porosities in the composite material.

The exchange surface area between the hydrogen and the pellets 6 is large, owing to the fact that it is located at the large diameter periphery of the pellets 6. In a variant, in order to increase this exchange surface area, there is axial play between each pellet 6 and each plate 40, so that the gaseous exchanges take place equally via the opposed surfaces of the pellets 6.

Comparative tests, the results of which are shown in FIGS. 7 to 10, were carried out in order to illustrate the improvement in performance obtained with a tank according to the invention.

A first hydrogen charging test was carried out on a tank such as that in FIGS. 1 and 2, comprising a container of 270 cm$^3$, but devoid of heat exchanger and heating elements, filled with 110 g of magnesium hydride powder. The tank was equipped with a flow meter and with temperature probes.

A second test was carried out with the same tank, this time filled with pellets of 7 cm outside diameter, each pellet comprising 5% by mass of ENG, and 95% of magnesium hydride powders, the whole of the pellets representing a total weight of 250 g and still devoid of heat exchanger and internal heating elements.

The two tests were carried out after complete dehydrogenation of the magnesium hydride contained in the tank, by arranging the tank in an oven in order to heat the tank to an initial temperature of 300° C., then placing the tank under hydrogen pressure of 0.8 MPa.

Figure 7:
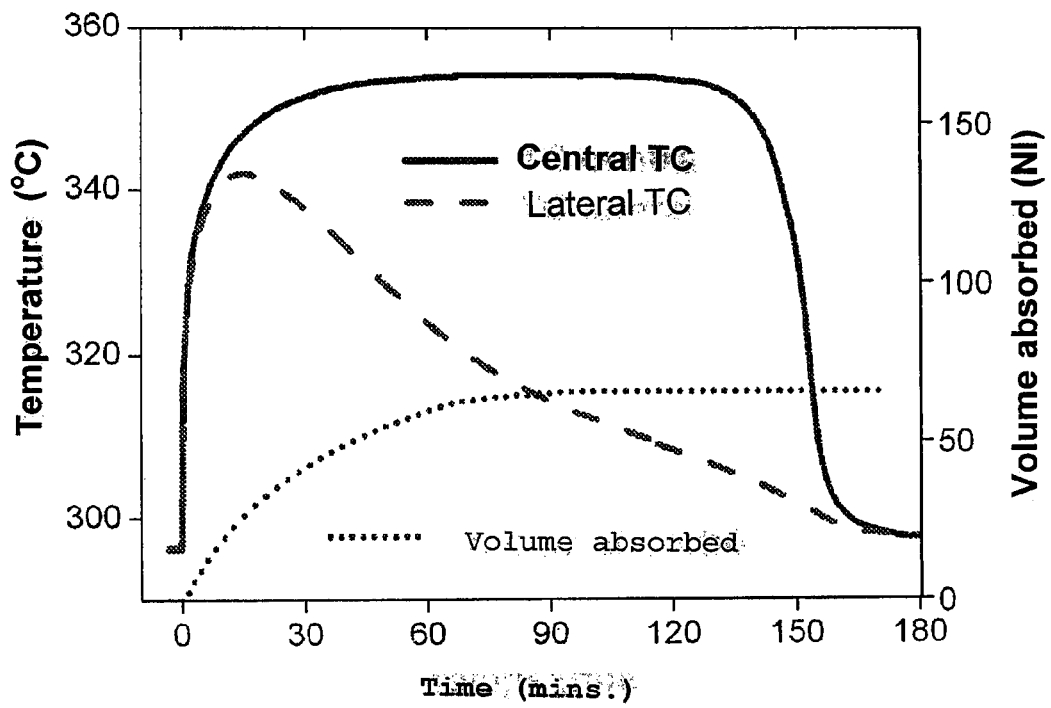
FIGS. 7 to 10 are graphs illustrating comparative tests of hydrogen charging of tanks for hydrogen storage in the form of metallic hydride.
Figure 8:
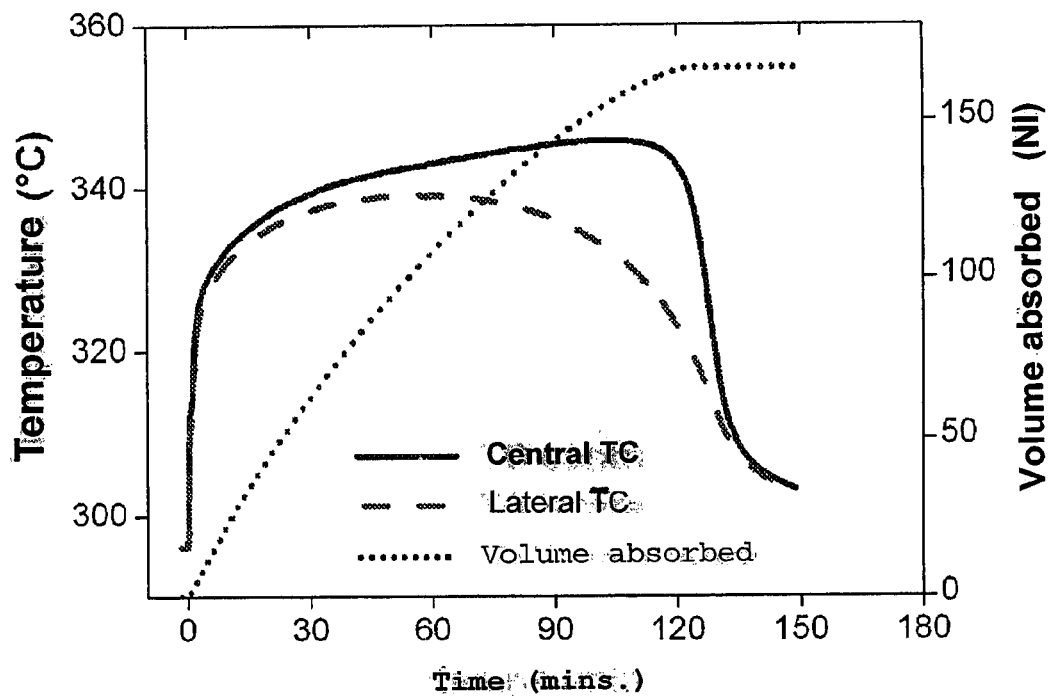

The graphs of FIGS. 7 and 8 illustrate the volume of hydrogen charged, the temperature at the centre and the temperature at the periphery of the tank for the first test (FIG. 7) and the second test (FIG. 8).

The volume of hydrogen absorbed by the pellets is greater than that absorbed by the powder: 170 NL against 65 NL (Normo Litres).

This is due to the fact that the compaction of the pellets increases the volume density of metallic hydride, and therefore the hydrogen storage volume capacity.

The hydrogen charging speed is greater with the pellets, and this although the mass of magnesium and therefore the amount of heat to be evacuated is multiplied by a factor of more than 2.

Comparison of the temperatures taken at the centre and at the periphery of the container shows that the temperature is more homogeneous in the pellets than in the powder.

These results show that the compacted composite material makes it possible to improve the thermal conductivity and the hydrogen storage volume capacity.

Figure 9:
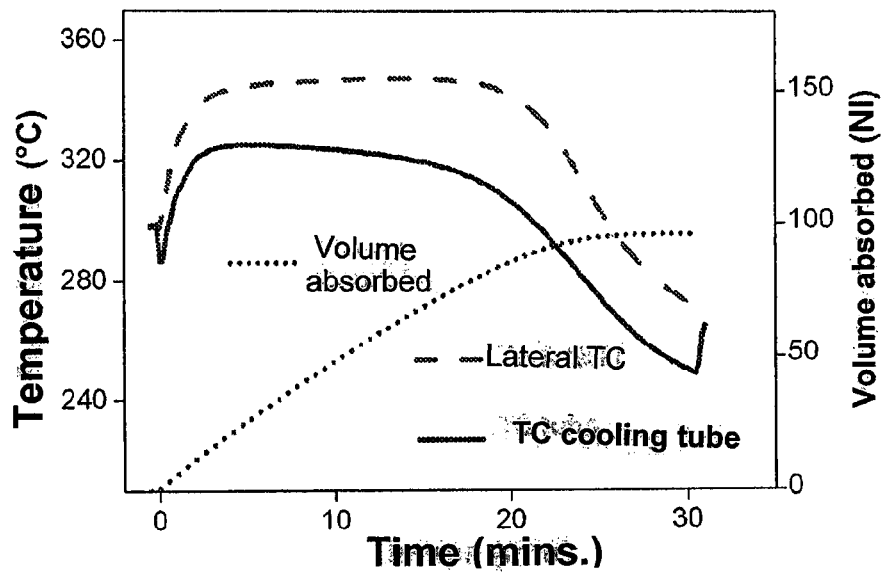
Figure 10:
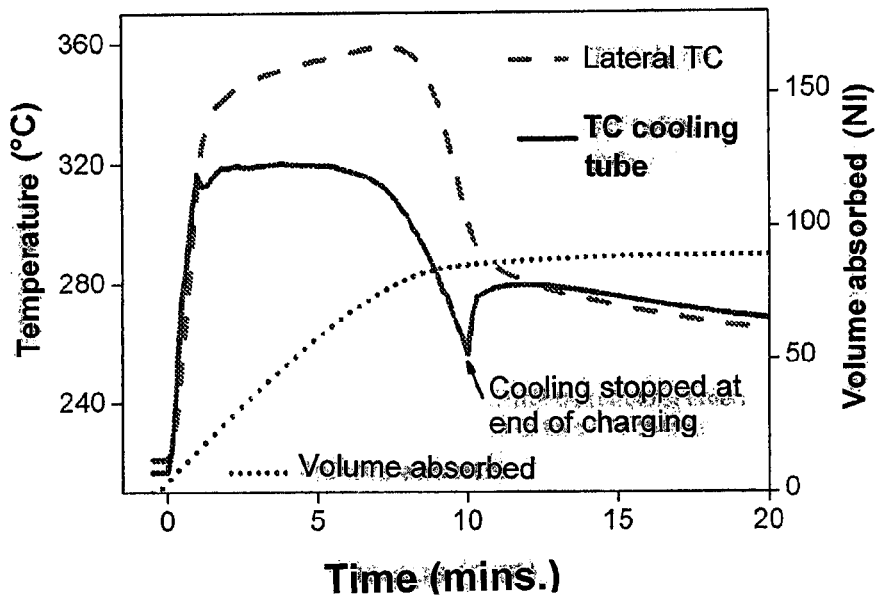

FIGS. 9 and 10 illustrate the third and fourth tests carried out by means of the same tank, equipped this time with the heat exchanger and heating elements. The tank thus conforms to that of FIGS. 1 and 2.

The third and fourth tests were carried out starting from different conditions. The initial conditions of the third test (FIG. 9) are: temperature 300° C., and pressure 1 MPa. The initial conditions of the fourth test (FIG. 10) are temperature 220° C., and pressure 1.6 MPa.

Charging is more rapid starting from 220° C.

Compared with the second test, it is noted in addition that charging is much more rapid with the heat exchanger. This is due to the fact that the reaction of hydrogenation of magnesium is very exothermic, and that in the absence of effective evacuation of the heat, the states of equilibrium are reached very rapidly. The reaction kinetics become very slow and lead to a very long charging time. The reaction may even be interrupted spontaneously in the parts of the tank which are least well cooled.

Comparison of the first test with the third and fourth tests shows a greater absorption volume in the second test. This is due solely to the fact that the amount of magnesium hydride was greater in the second test owing to the absence of a heat exchanger which occupies part of the volume of the tank.

The improved thermal conductivity of the pellets 6 facilitates the adjustment of the temperature of the pellets 6, thereby enabling the pellets to be maintained in temperature conditions favourable to rapid charging and discharging of hydrogen.

In addition, the presence of the heat exchanger facilitates the maintenance of the pellets in conditions that are more favourable for the charging of the tank with hydrogen.

Moreover, the arrangement of the pellets 6 in the tank 2 permits effective wetting. The annular space 22 between the pellets 6 permits good circulation and good distribution of the hydrogen, with a large contact surface area with the pellets 6. The annular clearance which is produced between the pellets 6 and the lateral inner surface of the container 4 permits expansion of the pellets during successive charging and discharging of the tank.

The high mechanical strength of the pellets 6 is not altered by the repetition of cycles of charging and discharging of the tank 2.

Figure 11:
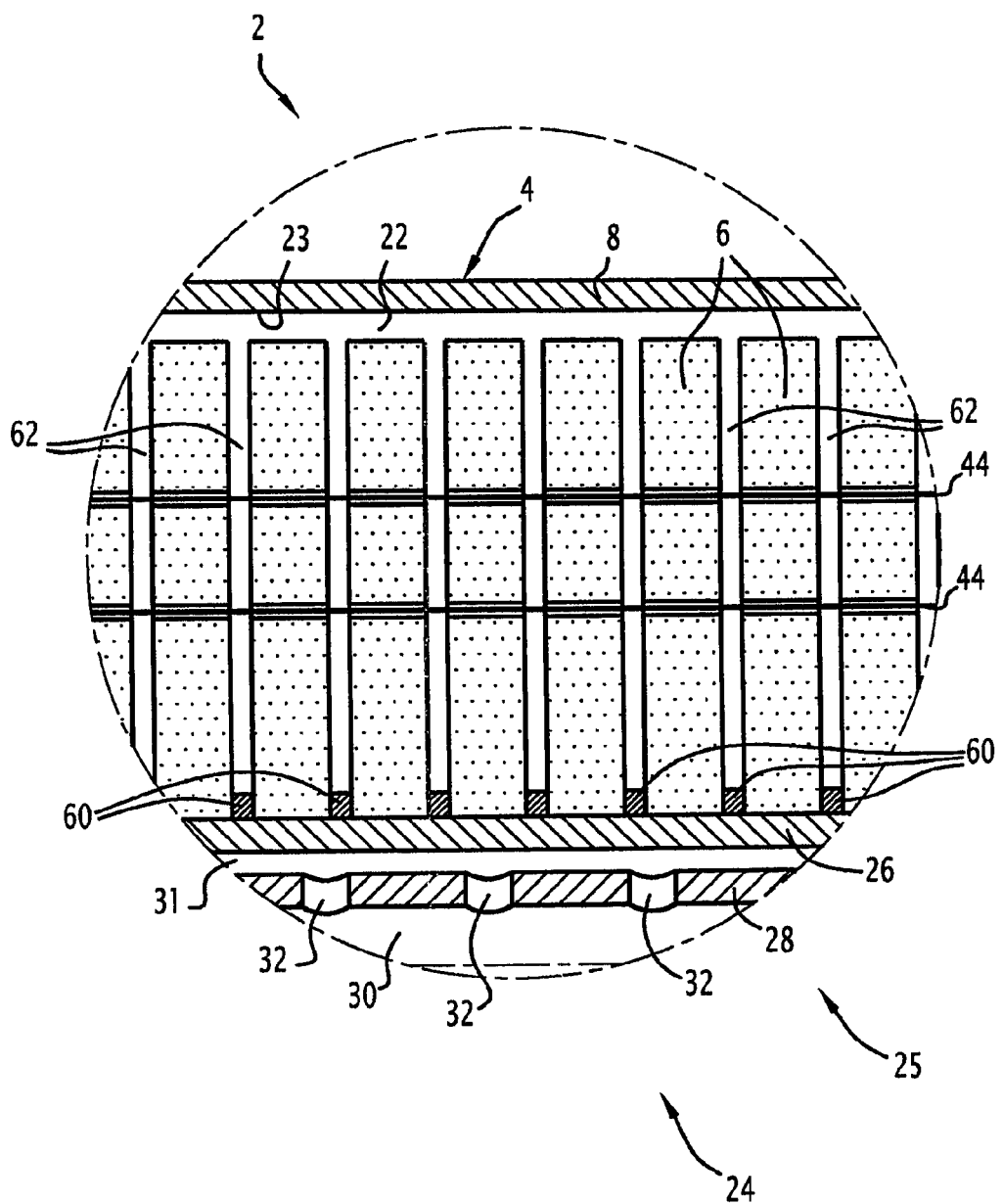
FIG. 11 is a view analogous to that of FIG. 2, illustrating a hydrogen tank according to another embodiment.

FIG. 11 is a view analogous to that of FIG. 2, illustrating a tank according to another embodiment. The reference numbers for elements similar to those of the first embodiment have been retained.

The tank 2 of the second embodiment differs from that of the first embodiment in that the heat exchanger 24 is devoid of metal plates inserted between the pellets 6.

The pellets 6 are threaded directly onto the outer tube 26 of the duct 25 of the heat exchanger 24, being kept spaced apart from one another by tubular spacers 60 inserted between the pellets 6 and enabling an annular space 62 to be kept free for the circulation of the gases between each pair of adjacent pellets 6.

The pellets 6 have an ENG content of about 20% by weight relative to the final composition.

The increase in the ENG content to about 20% makes it possible to increase the thermal conductivity of the pellets 6, and thus to compensate for the absence of metal heat exchange plates inserted between the pellets 6.

The omission of the metal plates makes it possible to limit the cost of the tank and its weight. This also makes it possible to avoid reaction of the metal forming the plates with the magnesium. The copper of plates made of copper could in time react with the magnesium to form a MgCu compound.

The tank of FIG. 11 has a gravimetric hydrogen capacity, i.e. the mass of hydrogen storable in the tank compared with the weight of the pellets 6, increased with respect to that of the tank of FIG. 2, i.e. the mass of hydrogen storable in the tank compared with the weight of the pellets 6 added to that of the metal plates.

Measurements carried out on the tanks of FIGS. 2 and 11 showed a gravimetric capacity of 2.9% by mass of hydrogen for the tank of FIG. 2, against a gravimetric capacity of 4.88% by mass of hydrogen for the tank of FIG. 11.

Maintaining a spacing between the pellets 6 enables a large exchange surface area to be obtained between the pellets 6 and the hydrogen, which makes it possible to obtain satisfactory hydrogen charging/discharging speeds.

Measurements carried out in a similar manner to that of the fourth test showed that a tank configuration without metal plates but with a proportion of ENG increased to about 20% by weight in the pellets 6 makes it possible to obtain hydrogen charging/discharging speeds and an amount of hydrogen stored of the same order as for the tank of the first embodiment, with metal plates, and with a proportion of ENG of about 5% by weight in the pellets 6.

The proportion of ENG of the pellets 6 is between 15% and 25%, in particular about 20%, to permit significant hydrogen storage while facilitating the thermal exchanges.

In a variant, the pellets 6 are not spaced apart, or are replaced by a single one-piece solid body.

The invention applies in particular to tanks for internal combustion engines or for fuel cells, in particular in motor vehicles, and more generally for any stationary or mobile application.

The invention claimed is:

1. A tank for storing hydrogen in the form of metallic hydride, comprising:
    a container for housing hydrogen;
    metallic hydride disposed inside the container; and
    at least one solid body formed of a compacted material comprising the metallic hydride and a matrix formed of expanded graphite.

2. The tank according to claim 1, wherein the expanded graphite is expanded natural graphite.

3. The tank according to claim 1, wherein the metallic hydride is a hydride of magnesium or of magnesium alloy.

4. The tank according to claim 1, further comprising a plurality of solid bodies stacked inside the container in a stacking direction.

5. The tank according to claim 1, wherein at least one each solid body is in the form of a pellet.

6. The tank according to claim 1, wherein at least one each solid body is held inside the container in such a way as to create an annular space between the lateral inner surface of the container and the or each solid body.

7. The tank according to claim 1, further comprising a heat exchanger comprising at least one duct for a heat exchange fluid, extending inside the container.

8. The tank according to claim 7, wherein the duct extends through solid bodies.

9. The tank according to claim 8, further comprising metal plates threaded onto the duct alternately with the solid bodies.

10. The tank according to claim 9, further comprising annular spacers threaded onto the duct alternately with the metal plates, at least one each solid body being threaded onto a spacer.

11. The tank according to claim 7, wherein the duct comprises a feed pipe and a discharge pipe for a heat exchange fluid which are substantially coaxial.

12. The tank according to claim 11, wherein the duct comprises an outer tube and an inner tube extending inside the outer tube, the inner tube defining one of the feed pipe and the discharge pipe for the heat exchange fluid, and the outer tube defining with the inner tube the other of the feed pipe and the discharge pipe.

13. The tank according to claim 12, wherein the feed pipe communicates with the discharge pipe via openings distributed along the inner tube.

14. The tank according to claim 12, wherein the discharge pipe is annular and surrounds the feed pipe.

15. The tank according to claim 1, comprising heating elements for the solid bodies.

16. The tank according to claim 15, wherein each heating element extends through several solid bodies.

17. The tank according to claim 15, wherein the heating elements are electrical resistances.

18. The tank according to claim 4, wherein the solid bodies are held spaced apart from one another along the stacking axis, with spaces for gas circulation between them.

19. The tank according to claim 18, wherein the or each solid body comprises between 15% and 25% by mass of expanded graphite, or about 20% by mass of expanded graphite.

20. The tank according to claim 9 wherein at least one each solid body comprises between 1 and 10% by mass of expanded graphite, or between 5% and 10% by mass of expanded graphite.

* * * * *